Figure 2:
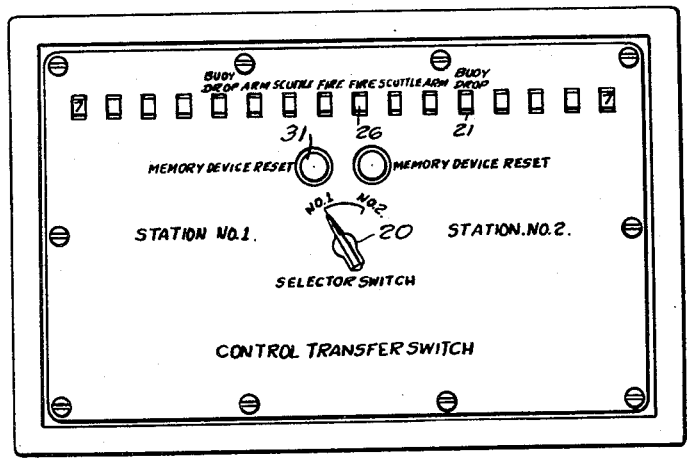

Jan. 19, 1954  W. SCHAELCHLIN ET AL  2,666,913
CONTROL SYSTEM

Original Filed Nov. 21, 1946  3 Sheets-Sheet 1

INVENTORS
Walter Schaelchlin,
Amos J. Winchester, Jr
and John C. Ponstingl.
BY
Paul E. Friedemann
ATTORNEY

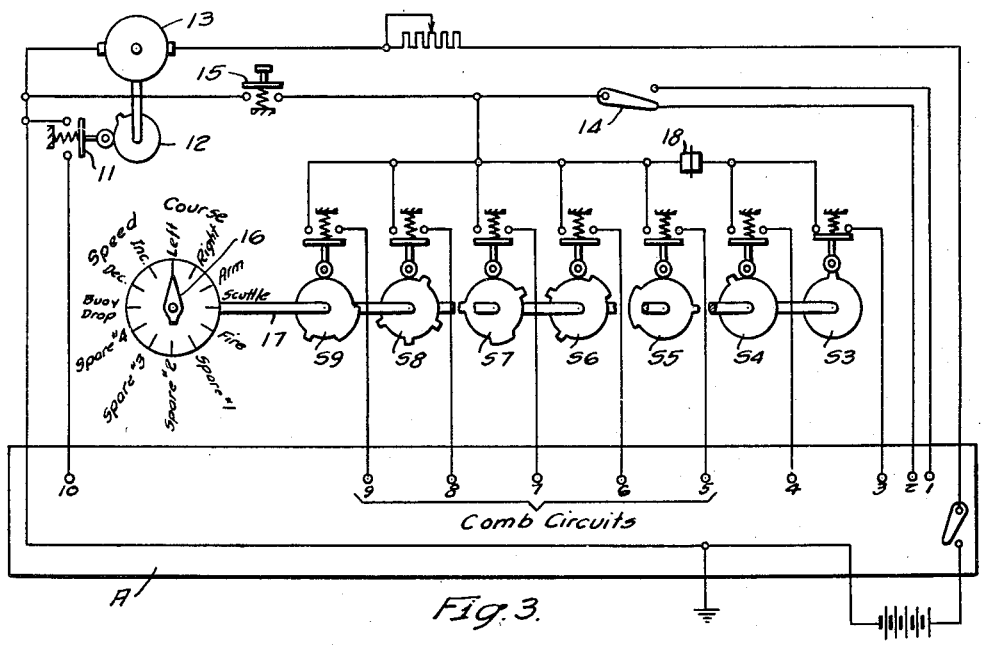

Fig. 3.

| Function | Transmitter | | | Radio Channel Used | Receiver | |
|---|---|---|---|---|---|---|
| | Selector Switches | Record Devices | Relays | | Receiver Relays | Control Relays |
| Drone #1 | 14 | | | 1 | R1 | 41 |
| Drone #2 | 14 | | | 2 | R2 | 41 |
| Left Course | S3 | 33 | CR-CR3 | 3 | R3 | |
| Right Course | S4 | 35 | CR-CR4 | 4 | R4 | |
| Dec. Speed | S-S6-S7 | 40 | CR | 6-7 | R6-R7 | CR6 - CR7 |
| Inc. Speed | S'-S6-S8 | 39 | CR | 6-8 | R6-R8 | CR6 - CR8 |
| Arm | S5-S6 | 28 | CR | 5-6 | R5 - R6 | CR6 |
| Scuttle | S5-S7 | 27 | CR | 5-7 | R5- R7 | CR7 |
| Fire | S5-S8 | 26 | CR | 5-8 | R5 - R8 | CR8 |
| Spare #1 | S6-S9 | 25 | CR | 6-9 | R6-R9 | CR6 - CR9 |
| Spare #2 | S7-S8 | 24 | CR | 7-8 | R7-R8 | CR7 - CR8 |
| Spare #3 | S7-S9 | 23 | CR | 7-9 | R7-R9 | CR7 - CR9 |
| Spare #4 | S8 - S9 | 22 | CR | 8-9 | R8-R9 | CR8 - CR9 |
| Buoy Drop | S5-S9 | 21 | CR | 5-9 | R5 - R9 | CR9 |
| Periodic Sig. | 3Min. Timer | | | 10 | R-10 | CR5-10Min.Timer |

Fig. 4.

INVENTORS
Walter Schaelchlin, Amos T. Winchester, Jr.
and John C. Ponstingl.
BY
Paul E. Friedemann
ATTORNEY Patented Jan. 19, 1954

2,666,913

UNITED STATES PATENT OFFICE 2,666,913

CONTROL SYSTEM

Walter Schaelchlin, Buffalo, and Amos J. Winchester, Jr., Lockport, N. Y., and John C. Ponstingl, Parma, Ohio, assignors, by mesne assignments, to the United States of America as represented by the Secretary of the Navy Original application November 21, 1946, Serial No. 711,428, now Patent No. 2,551,972, dated May 8, 1951. Divided and this application April 28, 1950, Serial No. 158,832

4 Claims. (Cl. 340—351)

This invention relates to a remote control system and, more particularly, to a system for controlling the operation of a ship or the like from a remote point.

This application is a division of applicants' copending application Serial No. 711,428, filed November 21, 1946, Patent No. 2,551,972, issued May 8, 1951, entitled Control System and assigned to the assignee of this invention.

In the operation of ships, particularly in the case where it is desired to load the ship with explosives and use the ship in a demolition operation, it is desirable to control all operations of the ship from a remote point. This problem is rendered difficult by reason of the numerous operations to be controlled in order that the ship may be directed to the desired point for the explosion. It is necessary to provide means for controlling the clutching and throttling of the power mechanism for propelling the ship and also to control the steering mechanism of the ship. In addition to such prime operations, it is necessary to provide means for controlling other operations, such as the arming and firing of the explosive which is carried by the ship being used in the demolition operation.

Accordingly, one of the principal objects of this invention is to provide apparatus by which the operation of a ship may be effectively controlled from a remote point. To this end, this invention contemplates the provision of radio transmitting apparatus adapted to be located at a point remote from the ship being controlled, and radio receiving apparatus adapted to be located on the ship being controlled, together with a novel form of control mechanism for controlling the operation of both the transmitting and receiving apparatus, whereby the numerous operations incidental to remotely controlling the ship may be affected. The radio apparatus employed is preferably of the pulse type having a plurality of channels respectively adapted to deal with pulses of radio energy of different frequencies. The control mechanism is arranged so that two or more channels may be operated at one time, no combination of channels being the same, in order that a number of operations, greater than the number of radio channels provided, may be controlled.

The above and other objects of this invention will become apparent during the course of the following description.

Figure 1:
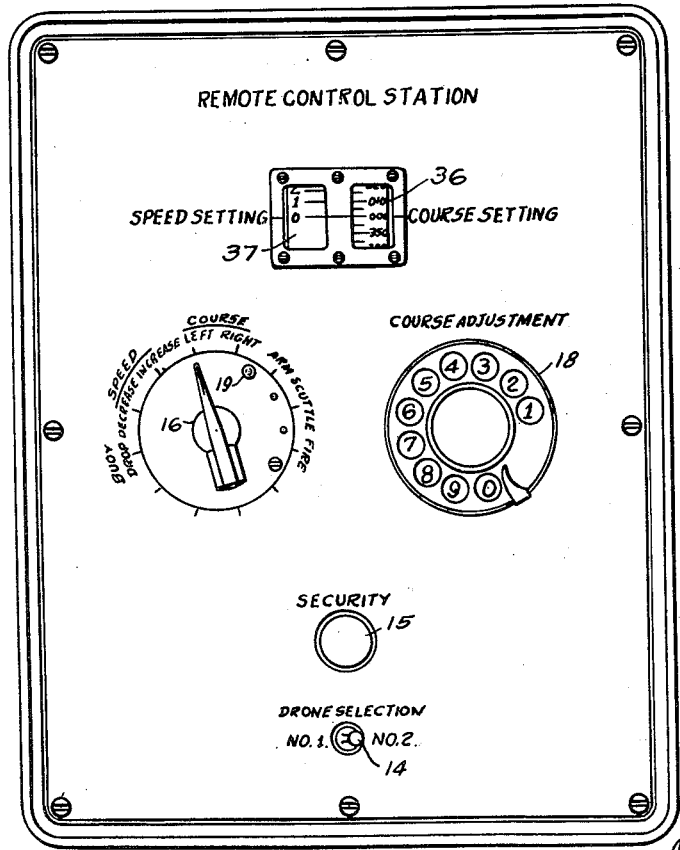
Figure 5:
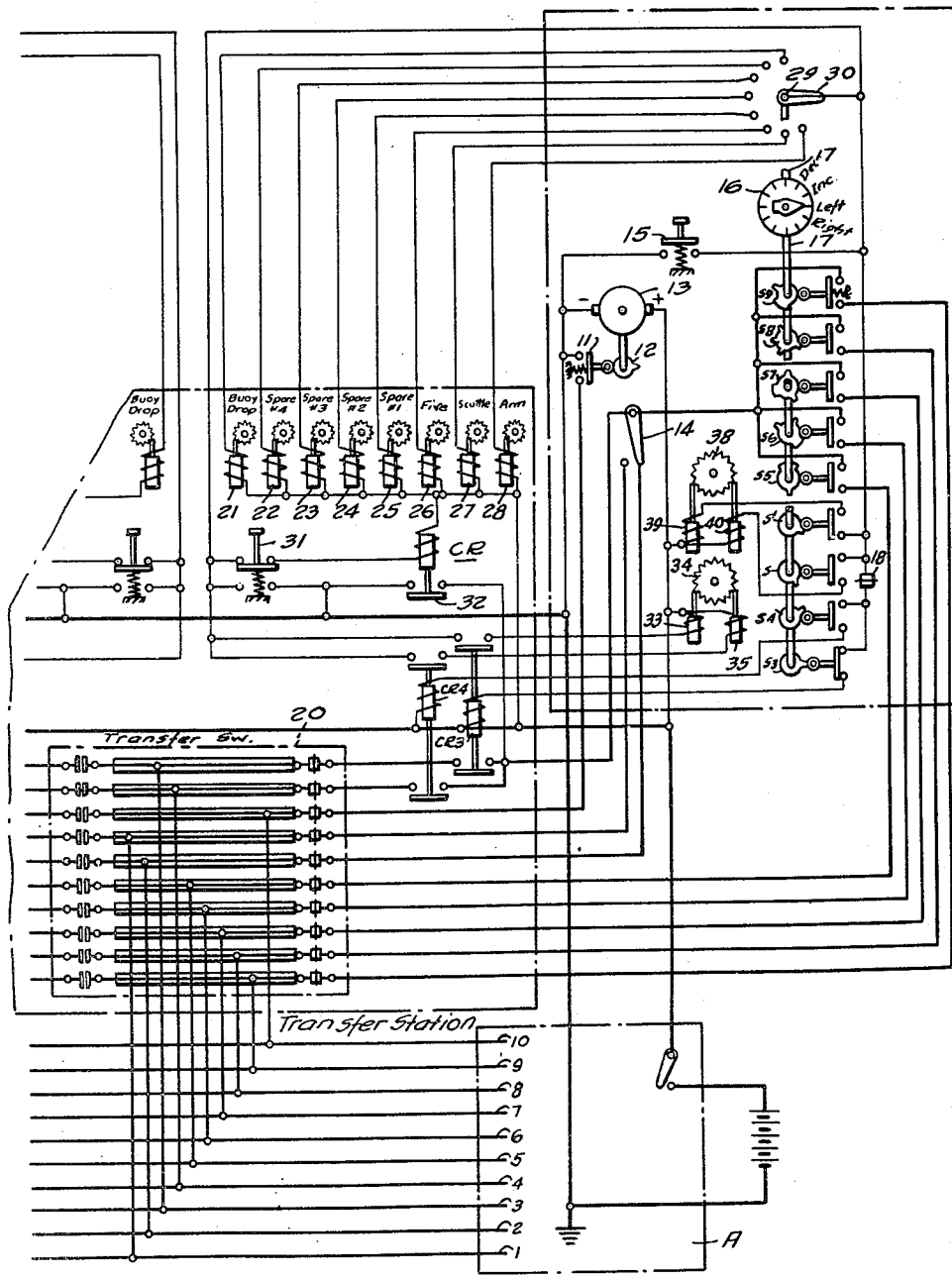

In the drawings there is shown a preferred embodiment of the invention. In this showing:

Figure 1 is a plan view of a control station from which the various operations necessary for controlling the operation of one or more ships may be initiated, Fig. 2 is a plan view of a transfer station, which is employed when two control stations such as illustrated in Fig. 1 are used, and for indicating the various operations on board ship which have been performed, Fig. 3 is a schematic diagram illustrating a simplified form of transmitter control, particularly adapted for use where the remote control is air-borne, Fig. 4 is a chart designating the elements shown in Fig. 3 and subsequent figures which are employed for effecting certain operations, Fig. 5 is a partial view similar to Fig. 3 of a preferred form of transmitter control for use with control and transfer stations as illustrated in Figs. 1 and 2.

Referring to the Figs. 3 and 5 of the drawings, the letter A designates a radio transmitter which is employed for remotely controlling the desired operations. The transmitter A is provided with ten operating channels, numbered 1 through 10, which are respectively adapted to send out pulses of radio energy on different frequencies. In Fig. 6 of the Patent No. 2,551,972, issued May 8, 1951, the letter B designates radio receiving apparatus which is provided with ten tuned receiving channels respectively tuned to the frequency of the transmitting channels of the transmitter A. The construction and operation of the transmitters A and receivers B form no part, per se, of this invention, any transmitter and receiver known in the art and having ten separate channels being employable for the purpose of this invention. The showings of Figs. 3 and 5 illustrate the manner in which the transmitting apparatus is controlled. For an understanding of the operation of the transmitter, it will be sufficient to point out that at any time one of the leads to the various channels is connected to ground, such channel will operate to transmit radio energy at its predetermined frequency. Since more than ten control operations must be provided, it is necessary that certain of the channels be caused to operate simultaneously in combination. The manner in which the ten channels are operated to perform a greater number of operations will become apparent during the course of the following description.

Three of the channels (1, 2 and 10) are employed and set aside as control channels. Referring to Fig. 3, it will be seen that channel 10 is connected to ground by means of a switch 11 under the control of a cam 12 operated by a timer motor 13. The timer motor 13 through a suitable drive (not shown) is adapted to rotate the cam 12, one revolution every three minutes. Accordingly, every three minutes, the cam 12 will operate to close the switch 11 and thus cause channel 10 to emit a pulse of radio energy. Upon failure of the channel 10 to send out a periodic timing pulse, or of the receiver channel 10 to receive such a pulse, the apparatus will operate to move the ship's throttle to its idling position and de-clutch the ship's driving motors in a manner to be described.

Channels 1 and 2 are employed as drone selector channels for the purpose of enabling the control apparatus to operate a selected one of two ships. The channels 1 and 2 are connected to ground and caused to transmit radio energy on their respective frequencies through a drone selector switch 14 and a security switch 15. In a manner which will become apparent, any operation performed on board ship must be accomplished through operation of either the channel 1 and 2 and at least one of the channels 3 through 9. The drone or ship being controlled is set up initially with one of its receiver channels 1 or 2 selectively rendered receptive in a manner to be described. Thus, one of the transmitter channels 1 or 2 must be selected in accordance with the selection made of the receiver channels 1 or 2 on board the drone or ship being controlled. By the use of the drone selector channels 1 and 2 in combination with the remaining channels 3 through 9, it is possible for one control station to operate two different ships, and the possibility of the control apparatus being jammed by enemy transmitters is rendered difficult.

A manually operable dial 16 is provided for setting up the control apparatus in accordance with the operation to be performed aboard ship. Rotation of the dial 16 to the various operations indicated rotates a shaft 17 which varies the position of cams and switches operated thereby, designated S3 through S9, which respectively control the transmitting operation of channels 3 through 9. In the showing of Fig. 3, the dial 16 designates left course and in this position the cam S3 has operated to close its associated switch so that transmitter channel 3 will be connected to ground upon closure of the security switch 15. Upon movement of the dial, one step to right course, S4 will close to similarly connect channel 4 to ground. For channel 3 or 4 to operate to vary the course of the ship to left or right, the ship drone selector channel 1 or 2 must be operated at the same time as will become apparent later. Channels 3 and 4 are the only channels which are operated singly in combination with either of channels 1 or 2. The remainder of the channels 5 through 9 under the control of cam switches S5 through S9 are operated two at one time. For example, in arming the explosive which is on board ship, the channels 5 and 6 are connected to ground through the cam operated switches S5 and S6 upon operation of the security switch 15. The chart in Fig. 4 may be referred to under the column entitled, "Selector Switches," and the column entitled, "Radio Channel Used," to determine which of the channels are employed in the various operations as pointed out above. Accordingly, Fig. 4 may be employed to determine the specific circuits set up for each of the numerous operations listed which are to be performed aboard ship.

The control appartus shown in Fig. 3 is a simplified form of control where it is desired to effect control from an air-borne station and decreased weight of the apparatus is an essential consideration. When using this form of apparatus, the transfer switch and mechanism for indicating the operation performed shown in Fig. 2 are not used. The operator will merely turn the dial 16 to the operation desired and press the security button 15 to initiate performance of such operation. An ordinary telephone dial switch 18 is provided where the course of the ship is to be changed. For example, if it is desired to change the course of the ship 8° to the left, the dial 16 is placed on left course and the dial 18 is rotated 8 notches with the security button 15 held in its closed position. This will open and close the switch 18 between the connection of channel 3 to the transmitter and ground eight times. There thus will be eight pulses of energy sent out over channel 3 and the steering mechanism will be moved eight steps in the appropriate direction to change the course of the ship.

Referring to Fig. 1, it will be noted that a removable stop 19 is provided for cooperation with the dial 16. The stop 19 is provided for the purpose of preventing accidental movement of the switch 16 into the positions of arming, scuttling, or firing during such time as the ship is being maneuvered into the position where such operations are to be performed.

The schematic showing of Fig. 5 illustrates the preferred form of control apparatus and this arrangement shows how the controls illustrated in Figs. 1 and 2 are tied together. This apparatus embodies the same elements illustrated in Fig. 3 and the description in connection with Fig. 3 applies equally well to the apparatus shown in Fig. 5. The apparatus shown in Fig. 5 differs from that shown in Fig. 3 by reason of the inclusion of the transfer switch 20 and the indicating devices shown in Figs. 1 and 2. The transfer switch 20 is a two-position switch which is adapted to selectively connect the transmitter channels 1 through 10 to either of two control stations of the type illustrated in Fig. 1. By reason of this switch, only one control station may be used to operate the transmitter channels at one time, thus a plurality of memory devices, as shown in Fig. 2 will be operated by only one control station. The transfer switch 20 of Fig. 2 thus cooperates with the drone selection switch 14 of Fig. 1 and enables the controlling of either two separate drones or a single drone from two control stations and a single transmitter.

In connection with the showing of Fig. 5, it is to be understood that there is illustrated only a portion of the complete apparatus of the preferred embodiment. Since the preferred embodiment embodies two control stations, it will be apparent that the portion of the apparatus omitted from the showing of Fig. 5 is identical with the control device at the right of such figure. The preferred embodiment also employs two transmitters A and either control station operated will effect simultaneous operation of like channels in the two transmitters. The use of two transmitters provides a safety measure in the event of failure of one of the channels to transmit radio energy. Obviously, only one transmitter need be employed in the event that the precautionary feature provided by two transmitters is not desired.

In order that an indication may be had of the various operations, a plurality of solenoid operated indicating devices, 21 through 28, are provided. A control switch 29 is connected to the dial shaft 17 for rotation therewith. Upon movement of the contact arm 30 of the switch 29 to a position connecting with one of the stationary contacts of the leads from the operating coils of the solenoid operated indicators 21 through 28, a circuit is set-up which is completed upon operation of security switch 15. For example, upon movement of the dial 16 ninety degrees in a counterclockwise direction from the position shown in Fig. 5, the apparatus will be set up for the operation entitled Buoy Drop. In this position, control switches S5 and S9 will be operated and channels 5 and 9 will be rendered operative upon closure of the security switch 15, connecting such channels to ground. At the same time, a circuit will be completed from the positive side of the battery through the coil of the solenoid operated indicator 21 and switch 29 to ground. Thus, there will be an indication had at the control transfer station of Fig. 2 that the operation entitled, Buoy Drop, aboard the ship being controlled has been initiated. In the same manner, the solenoid operated indicators 22 through 28 function to perform their respective indications for the various positions of the dial control switch 16.

In the showing of Fig. 5, it will be noted that the security switch 15 is not operable to connect the channels directly to ground as is the case of the security switch 15 of Fig. 3. This function is performed by a control relay CR which has its upper terminal connected to the positive side of the battery and its lower terminal connected through the reset switch 31 to the security switch 15. Upon closure of the security switch 15 in this case, a circuit to ground will be completed through the relay CR which will pick up and close the contactor 32. Upon energization of the relay CR and closure of the contactor 32, channels 5 through 9 and channels 1 and 2 may be connected to ground.

Another difference in the showing of Fig. 5 is the employment of relay CR3 and CR4 for controlling the connection of channels 3 and 4 to ground. In the position shown, the control S3 is closed and upon closure of the security switch 15, relay CR3 will be energized and its lower contact will close to connect channel 3 to ground. At the same time, the upper contact of relay CR3 will close to complete a circuit to ground through the coil of solenoid 33. When solenoid 33 is energized, it will move a ratchet wheel 34 one notch in a clockwise direction. The ratchet wheel 34 carries an indicating device 36 shown in Fig. 1 which is calibrated in degrees from 0 to 360. Each time the solenoid 33 is operated, the course setting will be changed one degree and this change will be indicated on the dial 36 of the remote control station. The control relay CR4 operates in a like manner to energize the solenoid 35 and operate the ratchet wheel 34 in a counterclockwise direction for changes in right course. For each pulse over channels 3 or 4, the indicating device 36 will be operated 1° according to the direction in which change of course of the ship being controlled.

In order that speed and setting of the control lever may be indicated, the remote control station is provided with a speed setting dial 37 which is operated by a ratchet wheel 38. To actuate the ratchet wheel, solenoids 39 and 40 are provided and cam operated control switches S and S' are mounted on the shaft 17. In the event that the dial 16 is moved to the increase speed position, control switches S', S6, and S8 will be closed as indicated by reference to the chart of Fig. 4. The controls S6 and S8 function to operate channels 6 and 8 upon closure of the security switch 15, as set forth above. When the security switch is closed, a circuit will be completed through the coil of solenoid 40 and ratchet wheel 38 will be moved one notch in a clockwise direction. This change in speed setting will be indicated by the dial 37 carried by the ratchet wheel 38. The solenoid 39 is operated in a similar manner to indicate decreases in the speed setting. The throttle control lever is moved from idling to full open position, step by step, and this movement is preferably accomplished in ten steps. Suitable stops (not shown) may be provided to prevent movement of the ratchet wheel beyond the points indicated by extreme positions of the throttle lever.

The operation of the transmitter portion of the control apparatus will be apparent from the foregoing, it being sufficient to point out that the desired operation can be effected by turning the dial switch 16 to the position indicated for such operation and then operating the security switch 15. By referring to the chart of Fig. 4, the controls operated in the transmitter channels employed for effecting the operation can be readily ascertained.

The operation of the receiver portion of this apparatus is described in Patent No. 2,551,972, issued May 8, 1951.

Since certain changes may be made in the above construction and different embodiments of the invention may be made without departing from the scope thereof, it is intended that all the matter contained in the above description or shown in the accompanying drawings, shall be interpreted as illustrative and not in a limiting sense.

We claim as our invention:

1. In a radio control system for the remote operation of a ship or the like having multiple operations to be performed thereon, a radio transmitter having a plurality of transmitting channels including at least two master control channels and a timing signal channel, each of said channels being operative to transmit a distinctive control signal, a timing means operative to periodically energize said timing channel whereby a distinctive and regularly occurring timing signal is produced, means for selecting different combinations of said transmitting channels for simultaneous operation thereof including a master selector switch and a first series of switches interposed in the circuits of said transmitting channels, a single operating member movable to different positions for actuating selected combinations of said first series of switches, relay means responsive to the energization of said switches and operative to render selected transmitting channels operative, dial means in the circuit of a pair of said transmitting channels whereby distinctive control signals may be periodically and selectively produced, a second series of switches, an operating lever for said second series of switches mechanically linked to said single operating member and operable to selectively energize said second series of switches, individual electromagnetic indicating means in the circuit of each of said second series of switches and a portion of said relay means, said indicating means being operative to indicate the particular transmitting channels energized at any one time.

2. In a radio control system for the remote operation of a ship or the like having multiple operations to be performed thereon, a radio transmitter having a plurality of transmitting channels including at least two master control channels, each of said channels being operative to transmit a distinctive control signal, means for selecting different combinations of said transmitting channels for simultaneous operation thereof including a master selection switch and a first series of switches interposed in the circuits of said transmitting channels, a single operating member movable to different positions for actuating selected combinations of said first series of switches, relay means responsive to the energization of said switches and operative to render selected transmitting channels operative, dial means in the circuit of a pair of said transmitting channels whereby distinctive control signals may be periodically and selectively produced, a second series of switches, an operating lever for said second series of switches mechanically linked to said operating member and operable to selectively energize said second series of switches, individual electromagnetic indicating means in the circuit of each of said second series of switches and in series with a portion of said relay means, said indicating means being operative to indicate the particular transmitting channels energized.

3. In a radio control system for the remote operation of a ship or the like having multiple operations to be performed thereon, a radio transmitter having a plurality of transmitting channels including at least two master control channels and a timing signal channel, each of said channels being operative to transmit a distinctive control signal, a timing means operative to periodically energize said timing channel whereby a distinctive and regularly occurring timing signal is produced, means for selecting different combinations of said transmitting channels for simultaneous operation thereof including a master selector switch and a series of control switches interposed in the circuits of said transmitting channels, a single operating member movable to different positions for actuating selected combinations of said control switches, relay means responsive to the energization of said switches and operative to render selected transmitting channels operative, and dial means in the circuit of a pair of said transmitting channels whereby distinctive control signals may be periodically and selectively produced.

4. In a radio control system for the remote operation of a ship or the like having multiple operations to be performed thereon, a radio transmitter having a plurality of transmitting channels including at least two master control channels and a timing signal channel, each of said channels being operative to transmit a distinctive control signal, a timing means operative to periodically energize said timing channel whereby a distinctive and regularly occurring timing signal is produced, means for selecting different combinations of said transmitting channels for simultaneous operation thereof including a master selector switch and a series of control switches interposed in the circuits of said transmitting channels, a single operating member movable to different positions for actuating selected combinations of said series of control switches, a first relay means responsive to the energization of said switches and operative to render selected transmitting channels operative, and individual indicating means rendered operative by a second relay means responsive to a second series of switches for indicating the particular transmitting channels energized.

WALTER SCHAELCHLIN.
AMOS J. WINCHESTER, Jr.
JOHN C. PONSTINGL.

References Cited in the file of this patent

UNITED STATES PATENTS

| Number | Name | Date |
|---|---|---|
| 1,291,861 | Harlow | Jan. 21, 1919 |
| 1,778,077 | Holden | Oct. 14, 1930 |
| 1,787,620 | Favarger | Jan. 6, 1931 |
| 2,103,297 | Nelson | Dec. 28, 1937 |
| 2,395,132 | Mackenzie | Feb. 19, 1942 |
| 2,395,693 | Sorensen | Feb. 26, 1942 |
| 2,397,088 | Clay | Mar. 26, 1946 |
| 2,400,260 | Miller | May 14, 1946 |
| 2,404,401 | Plensler | July 23, 1946 |
| 2,405,603 | Parker | Aug. 13, 1946 |
| 2,419,417 | Omel | Apr. 22, 1947 |
| 2,450,516 | Kinkead | Oct. 5, 1948 |
| 2,580,453 | Murray | Jan. 1, 1952 |

FOREIGN PATENTS

| Number | Country | Date |
|---|---|---|
| 475,525 | Germany | Apr. 26, 1929 |